United States Patent [19]  
Munoz

[11] 3,862,090  
[45] Jan. 21, 1975

[54] PROCESS FOR PRODUCING OXYMETHYLENE COPOLYMERS

[75] Inventor: Edward Munoz, Kleberg, Tex.

[73] Assignee: Celanese Corporation, New York, N.Y.

[22] Filed: Aug. 28, 1973

[21] Appl. No.: 392,363

Related U.S. Application Data

[63] Continuation of Ser. No. 157,668, June 28, 1971, abandoned.

[52] U.S. Cl. ........ 260/67 FP, 260/429.7, 252/429 R
[51] Int. Cl. ............................................. C08g 1/20
[58] Field of Search ......... 260/157, 668, 670, 67 FP

[56] References Cited
UNITED STATES PATENTS
3,316,217   4/1967   Weissermel et al. ............ 260/67 FP
3,417,116   12/1968   Considine et al. ................ 260/429.7
3,654,228   4/1972   Ishida et al. ...................... 260/67 FP Primary Examiner—Lucille M. Phynes
Attorney, Agent, or Firm—Thomas J. Morgan; Linn I. Grim; Marvin Bressler

[57] ABSTRACT

A catalyst system for the production of oxymethylene copolymers with improved thermal stability and improved hydrolysis resistance and a process for the production of such oxymethylene copolymers are disclosed and claimed herein. The catalyst system comprises a non-complexed mixture of a Lewis acid polymerization catalyst and a non-acidic organo tin compound having at least one direct chemical bond from said tin atom to an atom selected from the group consisting of oxygen and sulfur.

11 Claims, No Drawings

PROCESS FOR PRODUCING OXYMETHYLENE COPOLYMERS

This is a continuation of the now abandoned application Ser. No. 157,668, filed June 28, 1971.

The present invention relates to a catalyst system for the production of oxymethylene copolymers with improved thermal stability and improved hydrolysis resistance, and a process for the production of such oxymethylene copolymers.

Oxymethylene copolymers having recurring $-OCH_2-$ units and having interspersed therein oxalklene units having at least two adjacent carbon atoms having been known for many years.

These polymers have been prepared by copolymerizing trioxane with cyclic ethers having at least two adjacent carbon atoms in the presence of a Lewis acid polymerization catalyst.

While these Lewis acid polymerization catalysts are useful for the copolymerization of trioxane with cyclic ethers having at least two adjacent carbon atoms the copolymers thereby produced must be subsequently treated to prepare copolymers of acceptable thermal stability and hydrolysis resistance. Typical of such treatments are solution and melt hydrolysis as disclosed in U.S. Pat. Nos. 3,174,948, 3,219,623; 3,318,848; 3,337,504; 3,418,280, and 3,419,529 among others.

The present invention is based on the discovery that by performing the copolymerization of trioxane with cyclic ethers having at least two adjacent carbon atoms with a Lewis acid polymerization catalyst, in the presence of a small amount of a non-acidic organo tin compound having at least one direct chemical bond from said tin atom to an atom selected from the group consisting of oxygen and sulfur, the copolymers thereby produced have acceptable thermal stability and hydrolysis resistance without the necessity of a subsequent of hydrolysis treatment.

As hereinbefore stated oxymethylene copolymers may be prepared by copolymerizing trioxane with cyclic ethers having at least two adjacent carbon atoms in the presence of Lewis acid polymerization catalyst.

Typical of such Lewis acid polymerization catalysts and a process for their use in the copolymerization of trioxane and cyclic ethers having at least two adjacent carbon atoms are described in detail in U.S. Pat. Nos. 2,989,506; 2,989,507; 3,027,352, and 3,484,399 among others, the disclosures of which are hereby incorporated by reference.

Further, non-acidic organo tin compounds having at least one direct chemical bond from said tin atom to an atom selected from the group consisting of oxygen and sulfur which are used according to the present invention as cocatalysts for the copolymerization of trioxane with cyclic ethers having at least two adjacent carbon atoms, while they will not by themselves polymerize trioxane are known as polymerization catalysts for the polymerization of formaldehyde. Typical of such catalysts and a process for their use in the polymerization of formaldehyde are contained in U.S. Pat. Nos. 3,256,245; 3,311,591; 3,311,592, 3,313,780; 3,316,219, and 3,470,135 among others the disclosures of which are hereby incorporated by reference.

While these non-acidic organo tin compounds having at least one direct chemical bond from said tin atom to an atom selected from a group consisting of oxygen and sulfur will not by themselves polymerize trioxane, their use in combination with a Lewis acid polymerization catalyst according to the instant invention for the copolymerization of trioxane with cyclic ethers having at least two adjacent carbon atoms will produce oxymethylene copolymers with improved thermal stability and improved hydrolysis resistance.

The Oxymethylene Copolymer

The oxymethylene copolymers with which this invention is concerned may be prepared by the copolymerization of trioxane with cyclic ethers having at least two adjacent carbon atoms. In general, the cyclic ethers which may be used are of the formula

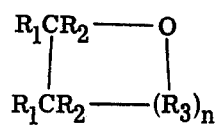

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene and lower alkyl and haloalkyl substituted oxymethylene radicals and $n$ is an integer from 0 to 3.

The preferred cyclic ethers used in the preparation of the desired copolymers are ethylene oxide and 1,3 dioxolane which may be designated by the formula

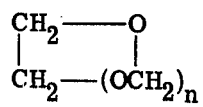

where $n$ is an integer from 0 to 2. Other cyclic ethers which may be used are 1,4 dioxane, trimethylene oxide, tetramethylene oxide, pentamethylene oxide, 1,2 propylene oxide, 1,2 butylene oxide, 1,3 butylene oxide and 2,2 di(chloromethyl) 1,3 propylene oxide.

Preferably the copolymer contains at least 60 mole percent of recurring oxymethylene units, most preferably it contains from about 85 to about 99.9 mole percent of recurring oxymethylene units and from about 0.1 to about 15 mole percent of oxyalkylene units, having at least two adjacent carbon atoms as derived from said cyclic ether. It will be understood, of course, that the term "oxymethylene copolymer" as used in this specification includes oxymethylene terpolymers produced by the terpolymerization of trioxane with more than one of the above cyclic ethers or with the polyepoxides or diformals of British Pat. No. 1,026,777, i.e., butanediol diglycidyl ether, the disclosure of which is hereby incorporated by reference.

The Lewis Acid Polymerization Catalyst

The Lewis acid polymerization catalysts with which this invention is concerned are those known in the art, as hereinbefore disclosed, for the copolymerization of trioxane with cyclic ethers. Typical of such Lewis acid polymerization catalysts are boron trifluoride, antimony trifluoride, antimony fluoroborate, bismuth trifluoride, bismuth oxyfluoride, rickelous fluoride, aluminium trifluoride, titanium tetrafluoride, manganous fluoride, manganic fluoride, mercuric fluoride, silver fluoride, zinc fluoride, ammonium bifluoride, phosphorous pentafluoride, hydrogen fluoride, phosphorous trichloride, titanium tetrachloride, ferric chloride, zirconium tetrachloride, aluminum trichloride, stannic chloride and stannous chloride and compounds containing these materials such as boron trifluoride coordinate complexes with organic compounds, particularly those in which oxygen or sulfur is a donor atom such as alcohols, phenol, an acid, an ether, an acid anhydride, an ester, a ketone, an aldehyde, a dialkyl sulfide or a mercaptan.

The Non-Acidic Organo Tin Compound

The non-acidic organo tin compounds with which this invention is concerned are those which contain at least one direct chemical bond from said tin atom to an atom selected from the group consisting of oxygen and sulfur. By direct chemical bond is meant that the bond from said tin atom to said oxygen or sulfur atom is one which satisfies a primary valence of said tin atom and said oxygen or sulfur atom. Thusly, organo tin compounds which do not contain such a direct chemical bond from said tin atom to said oxygen or sulfur atom, but which are coordinate complexes between said tin atom and said oxygen or sulfur atoms are not included within the definition of organo tin compounds having at least one direct chemical bond from said tin atom to an atom selected from the group consisting of oxygen and sulfur.

Typical of the non-acidic organo tin compounds which contain at least one direct chemical bond from said tin atom to an atom selected from the group consisting of oxygen and sulfur which may be used according to the instant invention are:

A. Tetravalent tin compounds:

trimethyltin acetate, di-n-butyltin diacetate, tri-n-butyltin acetate, dimethyltin maleate, di-n-butyltin maleate, di-n-butyltin dilaurate, di-n-butyltin distearate, di-n-butyltin salicylate, diethyltin dibenzoate, diethyltin bis(monolauryl phthalate), di-n-butyltin dicinnamate, di-n-butyltin oxide, di-n-butyltin oxylaurate, di-n-butyltin monomethoxymonoacetate, di-n-butyltin dimethoxide, di-n-butyltin monoacetyl monolauryl mercaptide, di-n-butyltin bis(mono-$\beta$-hydroxyethyl maleate), di-n-butyltin bis(monoethyl maleate) di-n-butyltin monomethoxymethyl maleate, di-n-butyltin dimethacrylate, diethyltin bis(mono-$\beta$-hydroxyethylthioglycolate), di-n-butyltin dibutylthioglycolate, di-n-butyltin bisoctylthiopropionate, di-n-butyltin bis-$\beta$-chloroethylthioglycolate, di-n-hexyltin bis(tetrahydrofurfuryl) thioglycolate, di-n-butyltin sulphide, di-n-butyltin diepoxyoleate, di-n-butyltin dimethyldithiocarbamate, bis(tri-n-butyltin)oxide. bis(tributyltin)sulphide.

B. Divalent tin compounds:

stannous formate, stannous acetate, stannous propionate, stannous butyrate, stannous octoate, stannous stearate, stannous benzoate, stannous sulfide, compounds of divalent tin with 2,6-ditertiary-butylphenols or thiophenols, stannous mercaptide, stannous oxide, stannous laurate and the like.

Preferred of these non-acidic organotin compounds are those which contain at least one direct chemical bond from said tin atom to an oxygen atom, and most preferred are the tin carboxylates.

According to the process of the instant invention the Lewis acid polymerization catalyst and the non-acidic organotin compound having at least one direct chemical bond from said tin atom to an atom selected from the group consisting of oxygen and sulfur may be simultaneously added to the trioxane and cyclic ether to cause copolymerization thereof or the Lewis acid polymerization catalyst and the non-acidic organotin compound may be added individually to the trioxane and cyclic ether or the Lewis acid polymerization catalyst and the non-acidic organotin compound may be premixed to form a simple mixture under conditions which will not cause complexation therebetween and the simple mixture added to the trioxane and cyclic ether. Complexes of Lewis acid polymerization catalysts and non-acidic organotin compounds and a process for their production disclosed in abandoned application Ser. No. 157,670 filed on June 28, 1961.

While under the conditions wherein the copolymerization of trioxane with the cyclic ether is conducted the Lewis acid polymerization catalyst and the non-acidic organotin compound may form an intermediary in situ complex therebetween which is effective for producing thermally and hydrolysis stable oxymethylene copolymers according to the instant invention, the direct addition of a complex between the Lewis acid polymerization catalyst and the non-acidic organotin compound to the trioxane and cyclic ether has been found to be ineffective for producing oxymethylene copolymers. Preferably the Lewis acid polymerization catalyst is first added to the trioxane and cyclic ether to begin the copolymerization and the non-acidic organotin compound is then added to the copolymerizing medium.

The copolymerization of trioxane and cyclic ether is conducted at a temperature of from about 50°C. to about 90°C., preferably from about 60°C. to about 80°C., the Lewis acid polymerization catalyst is used in amounts of from about 20 to about 100 parts per million (ppm), preferably from about 30 to about 70ppm based upon the combined weight of comonomers, and the non-acidic organotin compound having at least one direct chemical bond from said tin atom to an atom selected from the group consisting of oxygen and sulfur is used in amounts of from about 50 to about 500 parts per million (ppm), preferably from about 60 to about 250ppm, and most preferably from about 75 to about 125ppm, based upon the combined weight of comonomers.

In order that those skilled in the art may better understand how the present invention may be carried into effect the following examples are given by way of illustration and not by way of limitation.

In all of the following examples polymerizations were performed in an apparatus as described in U.S. Pat. No. 3,254,053.

The polymers were then ground quenched in a 0.125 weight percent solution of triethylamine in water at 75°F. filtered and then dried at 100°C. and 25 inches of mercury vacuum.

The present hydrolyzables of the above treated polymer which corresponds to the weight percent of formaldehyde evolved when the polymer is alkaline treated is then measured by analyzing for formaldehyde via the sodium sulfite method.

The thermal stability (Kd) of the above treated polymer which has been further compounded with stabilizing amounts of oxymethylene polymer stabilizers such as cyanoguanidine, melamine, calcium ricinoleate and 2,2'-methylene bis(4-methyl-6-t-butylphenol), and which corresponds to the percent per minute weight loss of the copolymer at 230°C. is then measured by subjecting 5 grams of the polymer to a temperature of 230°C. for 45 minutes. The total weight loss is then reported as weight percent loss per minute.

EXAMPLE I

Into a feed stream of trioxane containing 2.2 weight percent of ethylene oxide, based upon the weight of trioxane, and 750 parts per million (ppm) of methylal, based upon the combined weight of the trioxane and ethylene oxide as a molecular weight controller was injected 61ppm of boron trifluoride catalyst, based upon the total weight of the feed stream, and the mixture was fed at a rate of 30 pounds per hour into the polymerization apparatus which was at a temperature of 164°F.

The produced copolymer had a melt index of 26.7 grams per 10 minutes as measured at 190°F. by ASTM procedures.

The percent hydrolyzables of the copolymer was 9.54 weight percent and the Kd was greater than 0.1 percent per minute weight loss.

EXAMPLE II

Into a feed stream of trioxane containing 2.2 weight percent of ethylene oxide, based upon the weight of trioxane, and 880ppm of methylal, based upon the combined weight of the trioxane and ethylene oxide as a molecular weight controller was injected 60ppm of boron trifluoride catalyst, and the mixture was fed at a rate of 30 pounds per hour into the polymerization apparatus which was at a temperature of 164°F.

After the copolymerization had begun 125ppm of dibutyltin dilaurate based upon the weight of the feed stream was injected into the polymerization apparatus.

The produced copolymer had a melt index of 28.8 grams per 10 minutes as measured at 190°F. by ASTM procedures.

The percent hydrolyzables of the copolymer was 1.55 weight percent and the Kd was 0.018 percent per minute weight loss.

What this Example describes is that the cocatalyst system of the present invention produces a much more stable copolymer, at equivalent molecular weight of copolymer, than the process of the prior art.

The results are tabulated in Table I.

EXAMPLE III

Into a feed stream of trioxane containing 2.2 weight percent of ethylene oxide, based upon the weight of trioxane, was injected 52ppm of boron trifluoride catalyst, based upon the total weight of the feed stream, and the mixture was fed at the rate of 30 pounds per hour into the polymerization apparatus which was at a temperature of 164°F.

The produced copolymer had a melt index of 1.2 grams per 10 minutes as measured at 190°F. by ASTM procedures.

The percent hydrolyzables of the copolymer was 3.25 weight percent and the Kd was greater than 0.1 percent per minute weight loss.

EXAMPLE IV

Into a feed stream of trioxane containing 2.2 weight percent of ethylene oxide, based upon the weight of trioxane, was injected 52ppm of boron trifluoride catalyst, and the mixture was fed at a rate of 30 pounds per hour into the polymerization apparatus which was at a temperature of 164°F.

After the copolymerization had begun 90ppm of dibutyltin dilaurate based upon the weight of the feed stream was injected into the polymerization apparatus.

The produced copolymer had a melt index of 0.8 grams per 10 minutes as measured at 190°F. by ASTM procedures.

The percent hydrolyzables of the copolymer was 1.84 weight percent and the Kd was 0.017 percent per minute weight loss.

What this Example describes is that the cocatalyst system of the present invention produces a much more stable copolymer, at equivalent molecular weights of copolymer, than the process of the prior art.

The results are tabulated in Table I.

EXAMPLE V

Into a feed stream of trioxane containing 1.3 weight percent of ethylene oxide, based upon the weight of trioxane, 605 parts per million (ppm) of methylal, based upon the weight of the trioxane and ethylene oxide as a molecular weight controller and 0.025 weight percent of butanediol diglycidyl ether as termonomers based upon the total weight of feed stream was injected 61ppm of boron trifluoride catalyst, based upon the total weight of the feed stream, and the mixture was fed at a rate of 30 pounds per hour into the polymerization apparatus which was at a temperature of 164°F.

The produced terpolymer had a melt index of 12.1 grams per 10 minutes as measured at 190°F.

The percent hydrolyzables of the terpolymer was 4.68 weight percent and the Kd was greater than 0.1 percent per minute weight loss.

EXAMPLE VI

Into a feed stream of trioxane containing 1.3 weight percent of ethylene oxide, based upon the weight of trioxane, 690ppm of methylal, based upon the combined weight of the trioxane and ethylene oxide as a molecular weight controller and 0.025 weight percent of butanediol diglycidyl ether as termonomer, based upon the total weight of feed stream was injected 58ppm of boron trifluoride catalyst, and the mixture was fed at a rate of 30 pounds per hour into the polymerization apparatus which was at a temperature of 164°F.

After the copolymerization had begun 90ppm of dibutyltin dilaurate based upon the weight of the feed stream was injected into the polymerization apparatus.

The produced terpolymer had a melt index of 12.9 grams per 10 minutes as measured at 190°F. by ASTM procedures.

The percent hydrolyzables of the terpolymer was 3.80 weight percent and the Kd was 0.039 percent per minute weight loss.

What this Example describes is that the cocatalyst system of the present invention produces a much more stable terpolymer, at equivalent molecular weights of terpolymer, than the process of the prior art.

The results are tabulated in Table I.

EXAMPLE VII

Into a feed stream of trioxane containing 2.2 weight percent of ethylene oxide, based upon the weight of trioxane, and 360 parts per million (ppm) of methylal, based upon the weight of the trioxane and ethylene oxide as a molecular weight controller was injected 61ppm of boron trifluoride catalyst, based upon the total weight of the feed stream, and the mixture was fed at a rate of 30 pounds per hour into the polymerization apparatus which was at a temperature of 164°F.

The produced copolymer had a melt index of 9.1 as measured at 190°F. by ASTM procedures.

The percent hydrolyzables of the copolymer was 5.95 weight percent and the Kd was greater than 0.1 percent per minute weight loss.

EXAMPLE VIII

Into a feed stream of trioxane containing 2.2 weight percent of ethylene oxide, based upon the weight of trioxane, and 660ppm of methylal, based upon the combined weight of the trioxane and ethylene oxide as a molecular weight controller, was injected 65ppm of boron trifluoride catalyst, and the mixture was fed at a rate of 30 pounds per hour into the polymerization apparatus which was at a temperature of 164°F.

After the copolymerization had begun 90ppm of dibutyltin dilaurate based upon the weight of the feed stream was injected into the polymerization apparatus.

The produced copolymer had a melt index of 10.1 grams per 10 minutes as measured at 190°F. by ASTM procedures.

The percent hydrolyzables of the copolymer was 2.70 weight percent and the Kd was 0.019 percent per minute weight loss.

What this Example describes is that the cocatalyst system of the present invention produces a much more stable copolymer, at equivalent molecular weights of copolymer, than the process of the prior art.

The results are tabulated in Table I.

EXAMPLE IX

Into a feed stream of trioxane containing 2.2 weight percent of ethylene oxide, based upon the weight of trioxane, and 950 parts per million (ppm) of methylal, based upon the weight of the trioxane and ethylene oxide as a molecular weight controller was injected 50ppm of boron trifluoride catalyst, based upon the total weight of the feed stream, and the mixture was fed at a rate of 30 pounds per hour into the polymerization apparatus which was at a temperature of 164°F.

The produced copolymer had a melt index of 260 grams per 10 minutes as measured at 190°F. by ASTM procedures.

The percent hydrolyzables of the copolymer was 3.30 weight percent and the Kd was greater than 0.1 percent per minute weight loss.

EXAMPLE X

Into a feed stream of trioxane containing 2.2 weight percent of ethylene oxide, based upon the weight of trioxane, and 1050ppm of methylal, based upon the combined weight of the trioxane and ethylene oxide as a molecular weight controller, was injected 51ppm of boron trifluoride catalyst, and the mixture was fed at a rate of 30 pounds per hour into the polymerization apparatus which was at a temperature of 164°F.

After the copolymerization had begun 55ppm of stannous octoate based upon the weight of the feed stream was injected into the polymerization apparatus.

The produced copolymer had a melt index of 25.4 grams per 10 minutes as measured at 190°F. by ASTM procedures.

The percent hydrolyzables of the copolymer was 1.82 weight percent and the Kd was 0.020 percent per minute weight loss.

What this Example describes is that the cocatalyst system of the present invention produces a much more stable copolymer, at equivalent molecular weights of copolymer, than the process of the prior art.

The results are tabulated in Table I.

EXAMPLE XI

Into a feed stream of trioxane containing 2.2 weight percent of ethylene oxide, based upon the weight of trioxane, was injected 50ppm of boron trifluoride catalyst based upon the total weight of the feed stream, and the mixture was fed at a rate of 30 pounds per hour into the polymerization apparatus which was at a temperature of 164°F.

The produced copolymer had a melt index of 2.7 grams per 10 minutes as measured at 190°F.

The percent hydrolyzables of the copolymer was 3.86 weight percent and the Kd was greater than 0.1 percent per minute weight loss.

EXAMPLE XII

Into a feed stream of trioxane containing 2.2 weight percent of ethylene oxide, based upon the weight of trioxane, was injected 50ppm of boron trifluoride catalyst, and the mixture was fed at a rate of 30 pounds per hour into the polymerization apparatus which was at a temperature of 164°F.

After the copolymerization had begun 100ppm of stannic chloride based upon the weight of the feed stream was injected into the polymerization apparatus.

The produced copolymer had a melt index of 3.3 grams per 10 minutes as measured at 190°F. by ASTM procedures.

The percent hydrolyzables of the copolymer was 5.60 weight percent and the Kd could not be measured because of copolymer instability.

What this Example describes is that the use of tin compounds which do not contain a direct chemical bond from said tin atom to an oxygen or sulfur atom as cocatalysts with a Lewis acid polymerization catalyst does not produce copolymers with improved thermal stability and improved hydrolysis resistance.

These results are tabulated in Table I.

EXAMPLE XIII

Into a feed stream of trioxane containing 2.2 weight percent of ethylene oxide, based upon the weight of trioxane, and 120 parts per million (ppm) of methylal based upon the weight of the trioxane and ethylene oxide as a molecular weight controller, was injected 50ppm of phosphorous pentafluoride catalyst, based upon the total weight of the feed stream, and the mixture was fed at a rate of 30 pounds per hour into the polymerization apparatus which was at a temperature of 164°F.

The produced copolymer had a melt index of 1.2 grams per 10 minutes as measured at 190°F. by ASTM procedures.

The percent hydrolyzables of the copolymer exiting directly from the polymerization apparatus with no quenching was 3.82 weight percent, and when this copolymer was compounded with stabilizers exhibited a Kd of greater than 0.1 weight percent per minute loss.

EXAMPLE XIV

Into a feed stream of trioxane containing 2.2 weight percent of ethylene oxide, based upon the weight of trioxane, and 120ppm of methylal, based upon the combined weight of the trioxane and ethylene oxide as a molecular weight controller was injected 50ppm of phosphorous pentafluoride catalyst, and the mixture was fed at a rate of 30 pounds per hour into the polymerization apparatus which was at a temperature of 164°F.

After the copolymerization has begun 200ppm of dibutyltin dilaurate based upon the weight of the feed stream was injected into the polymerization apparatus.

The produced copolymer had a melt index of 3.9 grams per 10 minutes as measured at 190°F. by ASTM procedures.

The percent hydrolyzables of the copolymer exiting directly from the polymerization apparatus with no quenching was 2.80 weight percent, and when this copolymer was compounded with stabilizers exhibited a Kd of 0.032 weight percent per minute loss.

What this Example describes is that the cocatalyst system of the present invention produces a much more stable copolymer, at equivalent molecular weights of copolymer, than the process of the prior art.

oxane, and 490ppm of methylal, based upon the combined weight of the trioxane and dioxolane as a molecular weight controller, was injected 55ppm of boron trifluoride catalyst, and the mixture was fed at a rate of 30 pounds per hour into the polymerization apparatus which was at a temperature of 164°F.

After the copolymerization had begun 110ppm of dibutyltin diluarate based upon the weight of the feed stream was injected into the polymerization apparatus.

The produced copolymer had a melt index of 7.1 grams per 10 minutes as measured at 190°F. by ASTM procedures.

The percent hydrolyzables of the copolymer was 4.9 weight percent and the Kd was 0.035 percent per minute weight loss.

What this Example describes is that the cocatalyst system of the present invention produces a much more stable copolymer, at equivalent molecular weight of copolymer, than the process of the prior art.

The results are tabulated in Table I.

Table I

| Example No. | Comonomer (a) (weight percent) | Termonomer (b) (weight percent) | Lewis acid (ppm) | Organo Tin (ppm) | Kd (weight % per) (minute loss) | Hydrolyzables (weight percent) | Melt Index grams per 10 minutes at 10 |
|---|---|---|---|---|---|---|---|
| I | 2.2 | 0 | 61 (c) | 0 (d) | >0.1 | 9.54 | 26.7 |
| II | 2.2 | 0 | 60 (c) | 125 (d) | 0.018 | 1.55 | 28.8 |
| III | 2.2 | 0 | 52 (c) | 0 (d) | >0.1 | 3.25 | 1.2 |
| IV | 2.2 | 0 | 52 (c) | 90 (d) | 0.017 | 1.84 | 0.8 |
| V | 1.3 | 0.025 | 61 (c) | 0 (d) | >0.1 | 4.68 | 12.1 |
| VI | 1.3 | 0.025 | 58 (c) | 90 (d) | 0.039 | 3.80 | 12.9 |
| VII | 2.2 | 0 | 61 (c) | 0 (d) | >0.1 | 5.95 | 9.1 |
| VIII | 2.2 | 0 | 65 (c) | 90 (d) | 0.019 | 2.70 | 10.1 |
| IX | 2.2 | 0 | 50 (c) | 0 | >0.1 | 3.30 | 26.0 |
| X | 2.2 | 0 | 51 (c) | 55 (e) | 0.020 | 1.82 | 25.4 |
| XI | 2.2 | 0 | 50 (C) | 0 | >0.1 | 3.86 | 2.7 |
| XII | 2.2 | 0 | 50 (c) | 100 (f) | (g) | 5.60 | 3.3 |
| XIII | 2.2 | 0 | 50 (h) | 0 | >0.1 | 3.82 | 1.2 |
| XIV | 2.2 | 0 | 50 (h) | 200 (d) | 0.032 | 2.80 | 3.9 |
| XV | 3.2 (i) | 0 | 55 (c) | 0 | 0.081 | 5.5 | 11.0 |
| XVI | 3.2 (i) | 0 | 55 (c) | 110 (c) | 0.035 | 4.9 | 7.1 |

(a) - ethylene oxide
(b) - butanediol diglycidyl ether
(c) - boron trifluoride
(d) - dibutyltin dilaurate
(e) - stannous octoate
(f) - stannic chloride
(g) - polymer was to unstable to measure
(h) - phosphorous pentafluoride

EXAMPLE XV

Into a feed stream of trioxane containing 3.2 weight percent of 1,3 dioxolane, based upon the weight of trioxane, and 300ppm of methylal, based upon the combined weight of the trioxane and dioxolane as a molecular weight controller, was injected 55 ppm of boron trifluoride catalyst, and the mixture was fed at a rate of 30 pounds per hour into the polymerization apparatus which was at a temperature of 164°F.

The produced copolymer had a melt index of 11.0 grams per 10 minutes as measured at 190°F. by ASTM procedures.

The percent hydrolyzables of the copolymer was 5.5 weight percent and the Kd was 0.081 percent per minute weight loss.

EXAMPLE XVI

Into a feed stream of trioxane containing 3.2 weight percent of 1,3 dioxolane based upon the weight of tri- It is to be understood that the foregoing detailed description is given merely by way of illustration and that many variations may be made therein without departing from the spirit and scope of the invention.

What is claimed is:

1. In a process for the production of oxymethylene copolymers of improved thermal stability and/or hydrolysis resistance by the copolymerization of trioxane with a cyclic ether having at least two adjacent carbon atoms and at least one oxygen atom with a Lewis Acid polymerization catalyst, the improvement which comprises conducting said polymerization in the presence of an organotin catalyst having at least one direct chemical bond from said tin atom to an atom selected from the group consisting of oxygen and sulfur.

2. The process of claim 1 wherein said Lewis acid catalyst is used in amounts of from about 20 to about 100 parts per million based upon the combined weight of trioxane and cyclic ether, and said organo tin catalyst is used in amounts of from about 50 to about 500 parts per million based upon the combined weight of trioxane and cyclic ether.

3. The process of claim 2 wherein said organo tin catalyst has at least one direct chemical bond from said tin atom to an oxygen atom and is used in amounts of from about 60 to about 250ppm, and said Lewis acid polymerization catalyst is used in amounts of from about 30 to about 70ppm, based upon the combined weights of trioxane and cyclic ether.

4. The process of claim 3 wherein said organo tin catalyst is a tin carboxylate and is used in amounts of from about 75 to about 125ppm based upon the combined weight of trioxane and cyclic ether.

5. The process of claim 4 wherein said tin carboxylate is stannous octoate.

6. The process of claim 4 wherein said tin carboxylate is dibutyltin dilaurate.

7. The process of claim 4 wherein said Lewis acid is boron trifluoride.

8. The process of claim 4 wherein said Lewis acid is phosphorous pentafluoride.

9. The process of claim 4 wherein said cyclic ether is ethylene oxide.

10. The process of claim 4 wherein said organotin catalyst is added to the copolymerizing reactants after the Lewis acid has been added.

11. The process of claim 4 wherein said cyclic ether is 1,3 dioxolane.

* * * * *